235-382 SR
3/30/82 OR 4,322,719

United States Patent [19] [11] 4,322,719
Moorhouse [45] Mar. 30, 1982

[54] CODED SOLID STATE ENTRY DEVICE

[76] Inventor: John H. Moorhouse, Clear Lake, Minn. 55319

[21] Appl. No.: 200,394

[22] Filed: Oct. 24, 1980

[51] Int. Cl.$^3$ .......................... E05B 49/00; H04Q 3/00

[52] U.S. Cl. .................................... 235/382; 340/543; 340/825.32; 361/190

[58] Field of Search ........... 340/149 R, 147 MD, 543; 361/190; 70/277, 278

[56] References Cited

U.S. PATENT DOCUMENTS

| | | | |
|---|---|---|---|
| 2,831,129 | 4/1958 | Penney | 307/113 |
| 3,165,599 | 1/1965 | Clay | 200/44 |
| 3,639,906 | 2/1972 | Tritsch | 340/149 |
| 3,657,496 | 4/1972 | Davidson | 200/43 |
| 3,663,774 | 5/1972 | Feder | 200/42 R |
| 3,854,120 | 12/1974 | Matto | 340/164 R |
| 4,107,655 | 8/1978 | Moorhouse | 340/149 R |
| 4,258,358 | 3/1981 | Lee et al. | 340/543 |
| 4,277,777 | 7/1981 | Shulz et al. | 340/543 |

*Primary Examiner*—Donald J. Yusko
*Attorney, Agent, or Firm*—Leo Gregory

[57] ABSTRACT

A coded key operated solid state entry system for a controlled access to a multiplicity of electronic circuits by the use of corresponding coded keys embodying a detection and monitoring system, the detection and monitor system being activated by the insertion into the keyway of a coded key particularly adapted to successively engage a plurality of switches which engage a timer for a timed interval of key insertion and which energizes a circuit to unlatch normally latched tumblers and which upon rotation by the key to the extent of the code of the key, an optic coupling circuit is energized and the code of the tumblers is read, the optic coupler interfaces with a comparator which functions to match the code read with a corresponding coded electronic circuit. If the code is not matched with a corresponding circuit, the timed interval of the timer will expire and the circuit unlatching the tumblers will be caused to become de-energized locking up the tumblers and the key. If the code is matched to a circuit, the timer circuit is re-set for another interval of time for the return of the tumblers of their initial position, for the withdrawal of the key, access to the corresponding circuit having been achieved by the matchup.

11 Claims, 18 Drawing Figures

FIG. 12
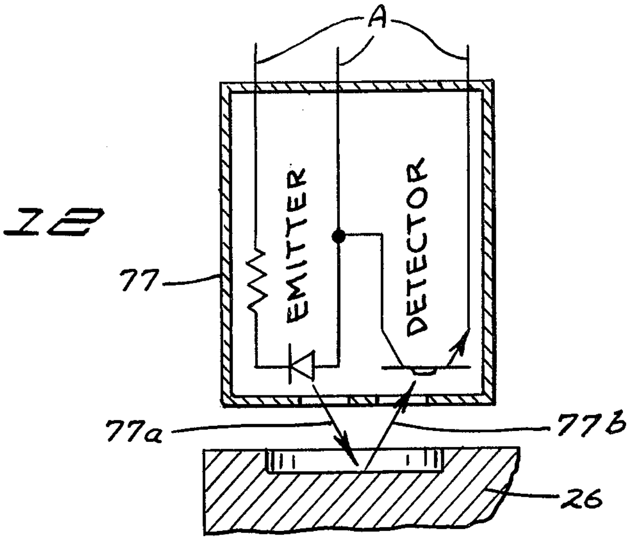
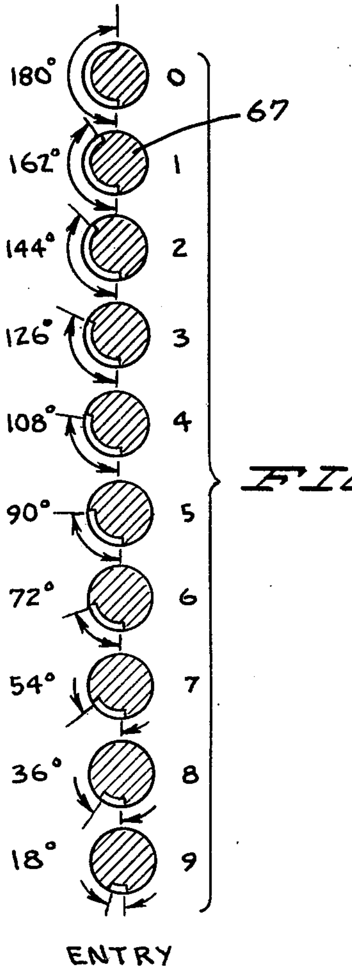
FIG. 13
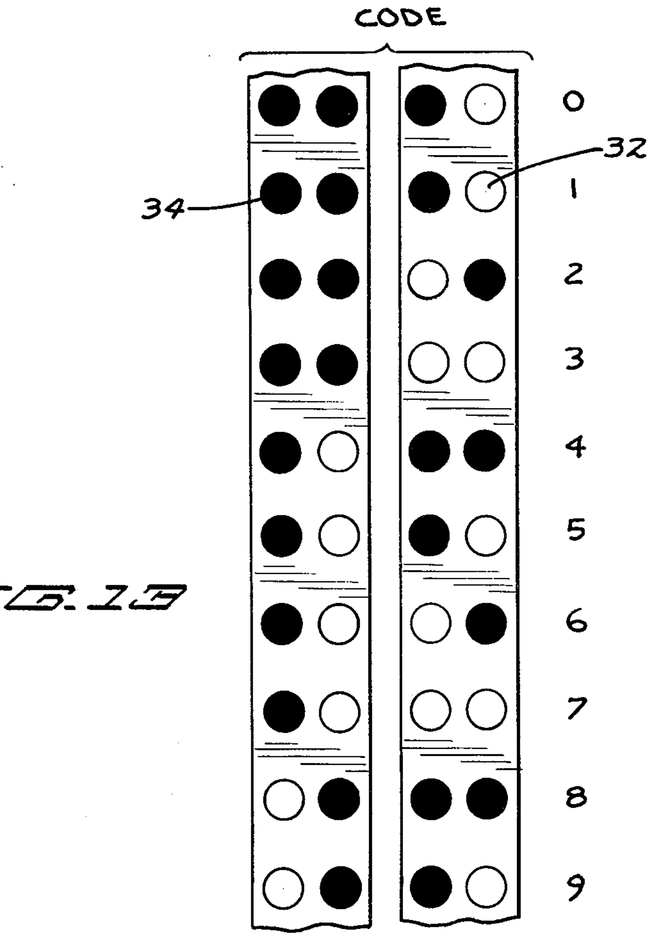
FIG. 14

CODED SOLID STATE ENTRY DEVICE

BACKGROUND OF THE INVENTION

1. Field of the Invention.

This invention relates to a coded key operated solid state entry system having an electronic controlled access to a multiplicity of corresponding coded electronic circuits and embodying a detection and monitoring system.

2. Description of the Prior Art.

A prior art type of related invention is disclosed in U.S. Pat. No. 4,107,655 issued Aug. 15, 1978 to the inventor herein in a device disclosing edge coded rotary tumblers, optic couplers and a structure adapted to receive a multiplicity of coded keys for access to corresponding circuits, but there is no provision for detection and monitoring the operation of the device.

SUMMARY OF THE INVENTION

The invention herein relates to an improvement over the type of structure disclosed in said U.S. Pat. No. 4,107,655 in embodying in the structure herein as improvement an electronic detection and monitoring system which effectively makes foolproof an effort to pick or wrongfully operate the entry system. The detection system monitors and controls the several stages of the operation of the entry system.

It is an object of the invention herein to provide a coded key operated entry system which by means of optic coupling has access to a multiplicity of electronic circuits and includes detection means which monitor several stages of the operation of the entry system to lock up the system upon failure of the key operation to meet the criteria for operating the entry system.

It is another object of this invention to provide a mechanically operated coded key entry device adapted to receive a multiplicity of coded keys operating tumblers to have access to a like number of corresponding electronic circuits, said access being had by means of an optic coupler which serves to match each code read by means of a comparator with a corresponding electronic circuit and a detection system monitors the entry and operation of a key into the keyway of the device.

More specifically, it is an object of this invention to provide a controlled coded key access device to electronic circuitry consisting of a coded key disposed into a keyway to engage switch members which energize corresponding circuits to unlatch the normally latched tumbler members and simultaneously energize a timing circuit and the optic couplers, the key rotates the tumblers to a coded position, the optic couplers interface with a comparator to match the key code as indicated by the tumblers with a corresponding coded electronic circuit for access thereto, upon a successful matching of the code of the tumblers with corresponding circuit, the timing circuit is re-set for an additional interval of time to permit the tumblers to be returned to their initial starting position and the key to be withdrawn or at the expiration of the re-set time interval, if the key is not withdrawn, the key and tumblers will be locked to prevent any attempt to misuse this device. In the event that a code is not matched up, then the entire device will become de-energized and the key together with the tumblers will become locked up and the key will not be removable. Thus misuse is thwarted.

These and other objects and advantages of the invention will be set forth in the following description made in connection with the accompanying drawings in which like reference characters refer to similar parts throughout the several views.

BRIEF DESCRIPTION OF THE DRAWINGS

FIG. 12 is a diagrammatic view on an enlarged scale of a detail of structure.

FIG. 13 is a diagrammatic view of a code arrangement for a key structure.

FIG. 14 is a view in elevation showing a code structure.

DESCRIPTION OF A PREFERRED EMBODIMENT

Figure 1:
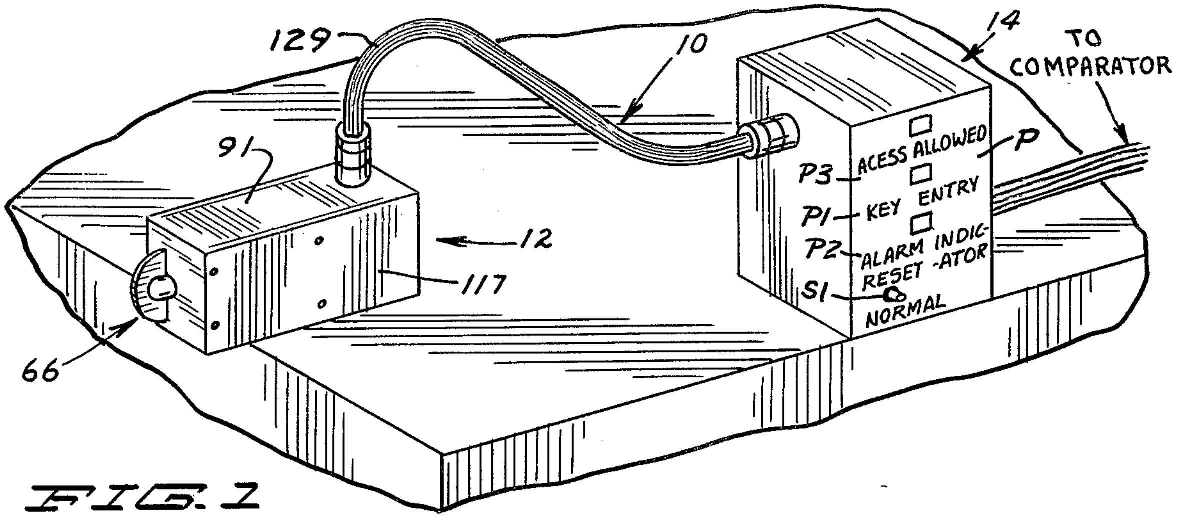
FIG. 1 is a general view in perspective.

Referring to the drawings, the entry system herein is indicated generally by the reference number 10 and comprises two basic component portions, a mechanically operated device or lock assembly 12 and its related electronic assembly 14.

The mechanical device or lock assembly 12 will first be described including the electrical and electronic elements therein.

Said device comprises a block member 16 indicated here as being cylindrical, the same having a longitudinal bore 18 therein having a bearing surface.

Secured to the ends of said block member as by screws are rectangular end walls 20 and 22.

Journaled into said bore in a side by side relation with just sufficient clearance within said bore to rotate easily are a plurality of cylindrical tumbler members or tumblers 25-28, the same respectively having aligned bores 25*a*-28*a*. Said tumblers may vary in number and the numbers shown here are for purpose of illustration and not for purpose of limitation. Said tumblers will be suitably made of a plastic or composition material having a self-lubricating characteristic or a low coefficient of friction.

The end walls 20 and 22 respectively have bores 20*a* and 22*a* in alignment with said bores of said tumblers. Extending into said bore 20*a* is a pin projection or pin 24 to serve as a stop member as will be further described.

The tumblers are of like construction and the tumbler 25 will be described as representative of the other tumblers.

Projecting into each of the bores of said tumblers 25–28 are pin-like projections or pins **25*b*–28*b* and in a key insertion or open keyway position said pins will be in alignment with said pin 24**.

Said tumbler 25 carries circumferentially about its edge portion code indicia or code spots 30.

In the instant embodiment for purpose of illustration, the code indicia presented is a reflective spot binary code as shown in FIG. 14 with said code indicia 30 comprising white and black spots disposed in transversely aligned pairs spaced about the edge portions of said tumblers, said white spots being indicated by the reference numeral 32 and the black spots by the reference numeral 34. The white spots have a sufficient reflection for the value of binary 1 and the black spots have a low reflection for the value of binary 0, as will be further described. The binary code is well known in the art and the composition of numerical values are presumed to be known and are not here described.

There are here shown, for purpose of illustrating the present embodiment, twenty aligned pairs of said indicia spots about the edge portion of each of said tumblers to provide the binary code readings here used.

As will be further described, the tumblers are arranged to be rotated not to exceed 180° whereby there are corresponding pairs of said spots on each diametrically opposed half portion of each of said tumblers for each digit. With the use of four tumblers as here shown, the code comprises four digits.

Each of said tumblers has spaced dimples or recesses 38 and 39 spaced centrally transversely about its edge portion between pairs of said indicia spots 30. Said recesses 38 and 39 each extend through not more than 180°.

Extending longitudinally of said cylindrical block member 16 in spaced relation to be respectively in vertical alignment with said recesses 38 of said tumblers are apertures or bores 40 each having therein a detent 41, said detents being shown here in the form of a ball and each having a spring 43 bearing thereon for pressure engagement thereof with said tumblers at said recesses and said springs are retained in said bores by an overlying plate 45 which is secured to said block member 16 in a suitable manner as by screws 47. Said tumblers are thus engaged by said detents to be indexed upon rotation. Said recesses 38 are of a size relative to said detents 41 merely to have frictional holding engagement with said tumblers for indexing purposes and do not become seated into said recesses sufficiently to be in a locking engagement.

Said block member 16 has a second set of apertures or bores 50 therethrough spaced thereacross respectively in alignment with said recesses 39 of said tumblers. Said bores 50 respectively have disposed therein detents 52 substantially cylindrical in form having lower portions **52*a* of reduced diameter disposed into accommodating inner counter-bores 50*a* forming shoulders 52*b*. Said lower portions 52*a* of said detents have coil compression springs 54 disposed thereon bearing against said shoulders 52*b* and being supported by the shoulder 50*b*** of the counter-bore. Said springs urge said detents to be free of engagement with said tumblers.

Said detents 52 are adapted to engage recesses 39 to have said tumblers indexed to such position that the detents 52 will be in alignment with corresponding diametrically opposed recesses 38 and seat thereinto for a locking or latching engagement with said tumblers to latch the same and thus prevent their rotation when locked. The recesses 39 are here shown to be larger and deeper than the recesses 38.

In alignment with said detents 52 and overlying the same is a rod 55 having one end portion **55*a* thereof recessed in a bearing sleeve 57 carried in said end wall 20 and having its other end portion 55*b* extending outwardly of said wall 22 to be connected to a solenoid 58 for axial movement, the same will be further described. Said rod as shown has inclined recesses 55*c* therein corresponding to and positioned with regard to each of said detents 52 whereby said rod normally bears against said detents 52 to latch said tumblers and the rod is drawn by the solenoid to have the recesses moved to overlie the detents, the detents are urged upwardly into said recesses by the springs 54 and thus become disengaged from the tumblers 25–28** to unlatch the same.

An extension spring 60 is secured at one end to said rod 55 adjacent the wall 22 by a screw or pin 62 secured to the cylindrical block 16 and the other end of said spring is secured in any convenient manner as by a small hook 63 secured to the block 16. The rod 55 is normally urged by said spring to be in the position to press or urge the detents 52 to be seated into the recesses 39 for locking engagement with said tumblers 25–28.

The bores **25*a*–28*a* of said tumblers taken with said bores 20*a* and 22*a* form a keyway 65 into which will be inserted a key 66** which is representative of the multiplicity of keys which may be received into said keyway as will be described.

Said block member 16 has a pair of diametrically opposed longitudinal slots 73 and 74 each having a length just sufficient to expose a longitudinal aligned row of said code spots 30 as displayed by the tumblers 25–28 herein. Thus there will be eight aligned code spots appearing through each of said slots.

Mounted along said slots to be focused upon said code spots in diametrically opposed horizontal alignment are sensing means or sensors 75 and 77 with a pair of said sensors being provided for each transverse or horizontal pair of code spots respectively carried by each of said tumblers. Among others available, a suitable type of sensor is the commonly used MCA7 sensor produced by Monsanto Corporation and sold as a shelf item. Said sensors provide both a light source of infra red from their respective emitters **75*a* and 77*a* directed at the aligned spots and sense the reflection from said spots by their detectors 75*b* and 77*b***.

Underlying and overlying said end walls 20 and 22 and extending thereover are printed circuit boards 80 and 82 providing circuits A for connecting the sensors 75 and 77 with an addressing box or comparator 85 of conventional design which will serve as a means to match up each code combination of said tumblers transmitted to it by the sensors with a corresponding coded circuit B to provide coded access to such circuit for whatever function said circuit is designed to perform. This match-up or comparator function is known in the art and requires no description. With an improper or invalid code sensed, there will be no match-up. The device will become locked up as will be described.

It will be understood that the multiplicity of circuits B will be prearranged to be identified to respectively correspond to the various code combinations possible with said device 10 and with the corresponding keys which rotate the tumblers to form the various access codes. Said sensors and the circuits A carried by said circuit boards serve as an interface to the comparator. Circuit boards and their construction are well known in the art and the circuitry thereon will be arranged to be suitable for the purpose herein.

In the embodiment of the invention here presented, there are 9999 possible code combinations resulting from the use of a like member of keys with corresponding circuits to which coded access may be had by a comparison and a matchup through said comparator 85.

Figures 4, 4A, 5:
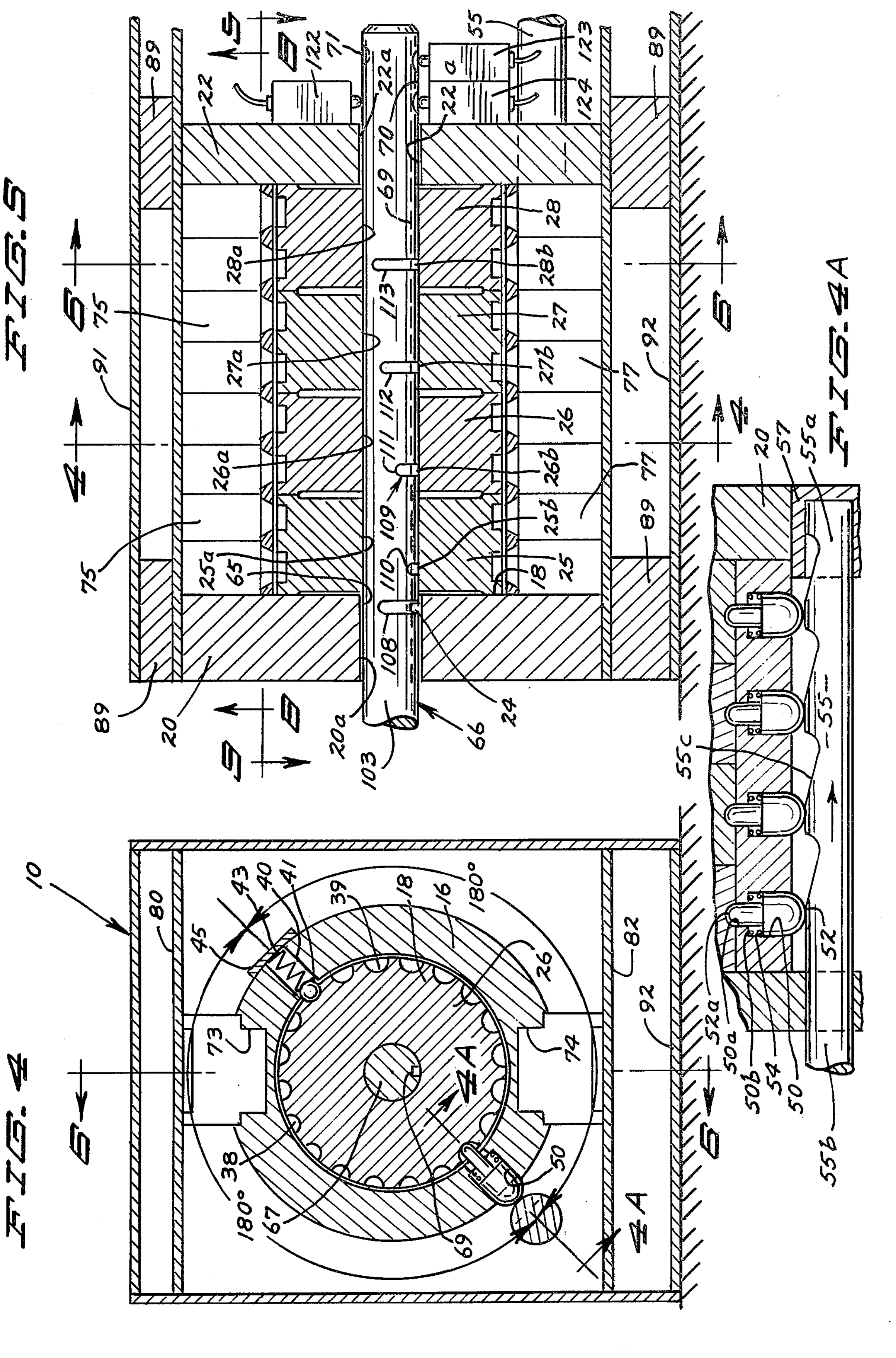
FIG. 4 is a view in vertical section taken on line 4—4 of FIGS. 2 and 5 as indicated.
FIG. 4*a* is a view in vertical section taken on line 4*a*—4*a* of FIG. 4 as indicated.
FIG. 5 is a view in longitudinal vertical section taken on 5—5 of FIG. 4 as indicated.
Figure 6:
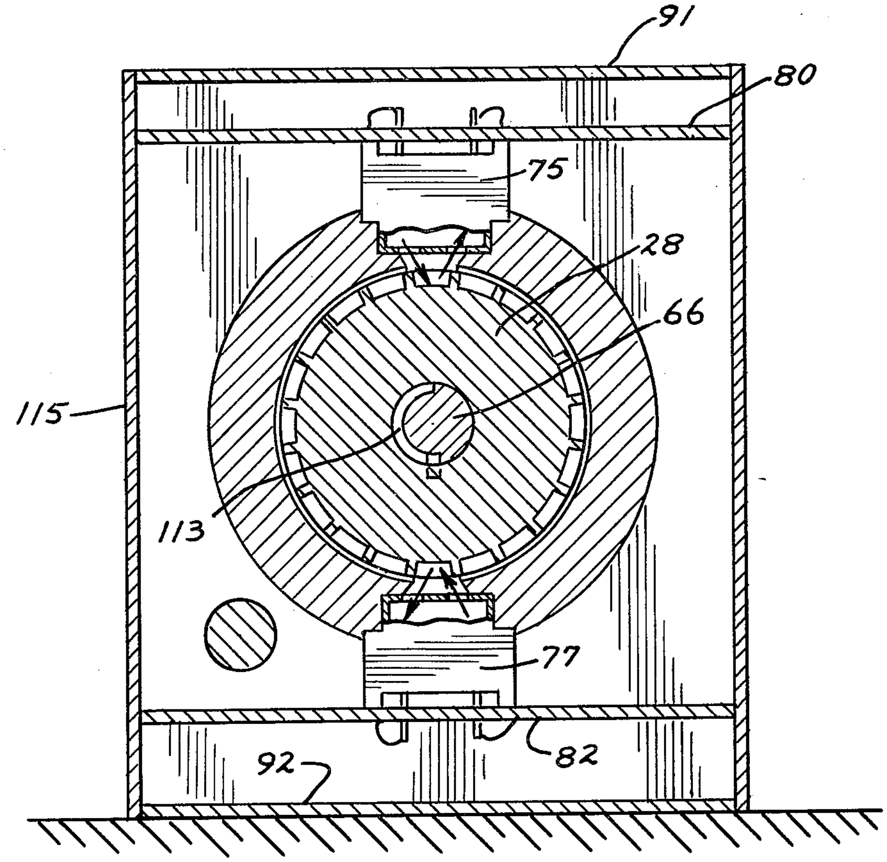
FIG. 6 is a view in vertical cross section taken on line 6—6 of FIG. 5 as indicated.
Figure 10:
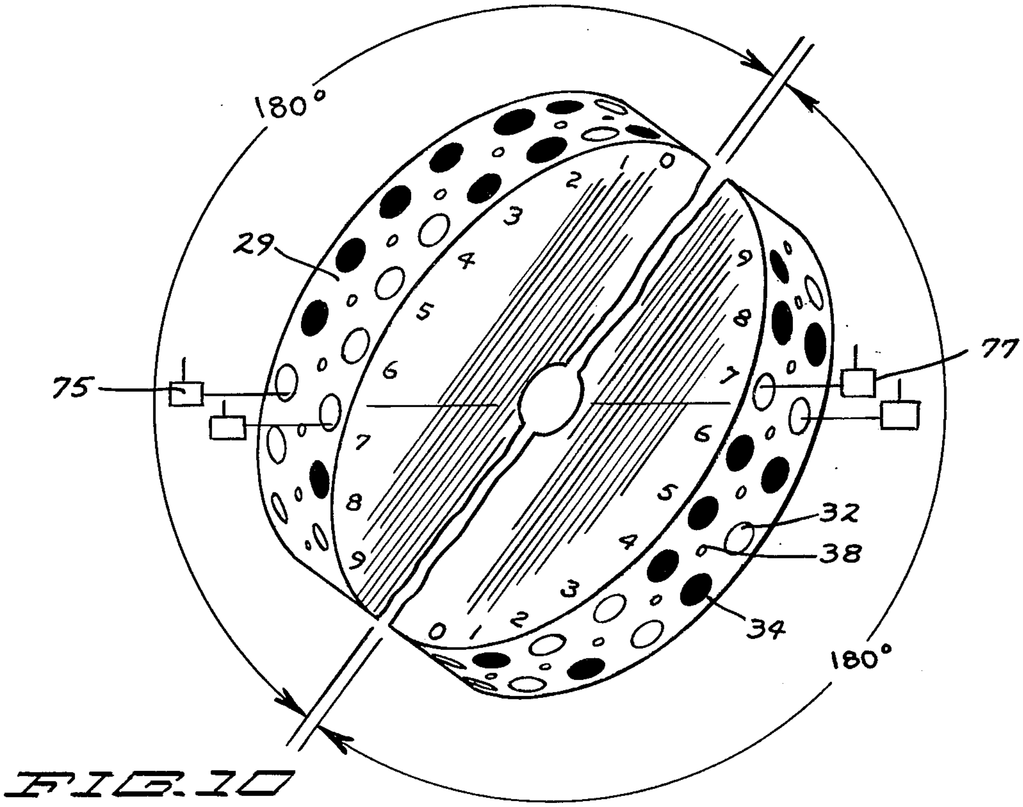
FIG. 10 is a broken view in perspective of a detail of tumbler structure.
Figure 11:
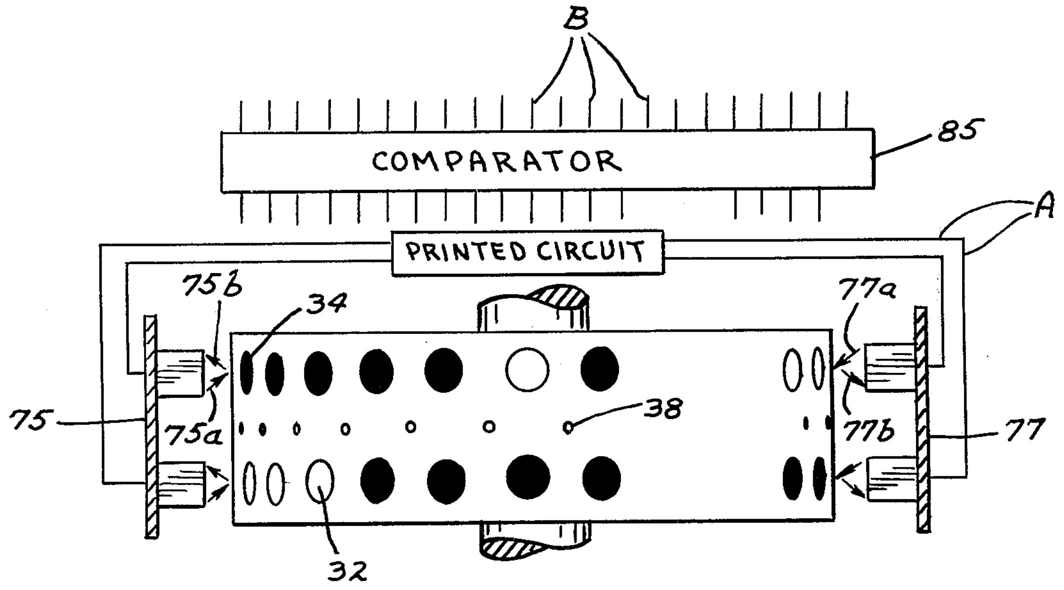
FIG. 11 is a top plan view with portions broken away of a detail of structure.

Referring particularly to FIGS. 5, 10 and 11, there are shown diagramatically the sensors 75 and 77 in their relative positions in opposed relation at each side of the tumbler 25 sensing the code spots 30 in alignment therewith.

The electrical circuits A of the printed circuit boards 80 and 82 are of conventional design and are arranged whereby the corresponding pairs of opposed spots of each tumbler form one digit of the code herein and upon being sensed by the optic couplers 75 and 77 are matched up by means of said comparator 85 with a corresponding circuit B for access to such circuit.

Said printed circuit boards 80 and 82 in their opposed relation respectively have spaced therefrom by spacers 89 the outer upper and lower walls 91 and 92 which are secured by screws 93 disposed therethrough threaded into the adjacent ends of said walls 20 and 22 and said side walls have portions 91*a* and 92*a* which extend in a direction indicated as being rearwardly of said wall 22. A chamber 96 is formed between said end walls 20 and 22 and said walls 91 and 92.

Figure 2:
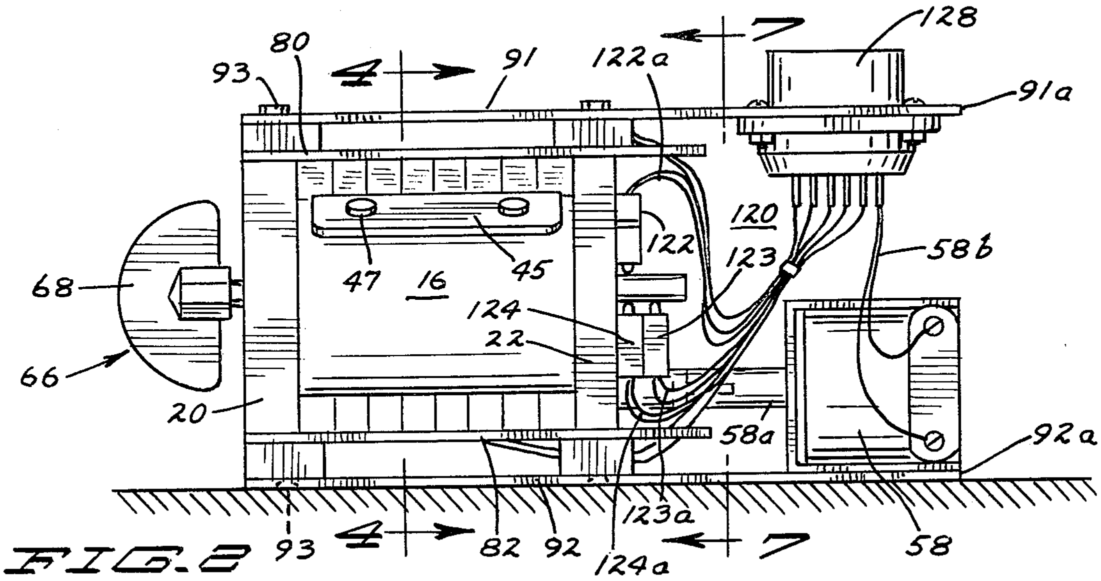
FIG. 2 is a view in side elevation of one side of the device with the side wall removed.
Figure 3:
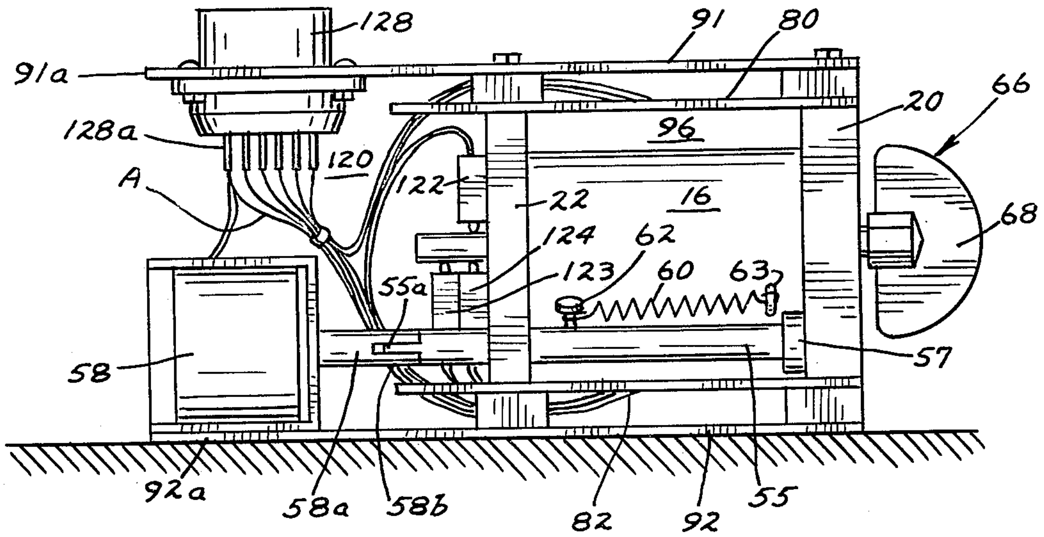
FIG. 3 is a view in side elevation of the other side of the device with the side wall removed.

Side walls 115 and 117 overlie and are suitably secured to the remaining ends of said end walls. Said walls 115 and 117 enclose the remaining sides of said chamber 96 and are coextensive with the walls 91 and 92 to form a chamber 120 therewith outwardly of the wall 22 as indicated in FIGS. 1 and 2.

Referring particularly to FIG. 5, said key 66 is shown comprising a shank 67 having an operating handle 68 formed at one end thereof. Extending along said shank to its end 70 is an open sided groove 69. Spaced circumferentially from said groove to be aligned with the end of the slot 108 to be described and adjacent said end 70 of said shank is a dimple or recess 71. Said shank is of a length to extend through the bore 22*a* as indicated.

Upon insertion of said key 66 into said keyway 65, the key will be circumferentially positioned to have the pins 24 and 25*b*–28*b* received into said groove 69. At the forward end of said groove adjacent the key handle 68 is a transverse groove 108 having an extent of not more than 180° and said groove will be aligned with the pin 24 which will move through said groove which serves as a stop member limiting the rotation of said key 66. Also formed into said shank to indicate the code 109 of the key are transverse grooves 110–113 in alignment respectively with the pins 25*b*–28*b*. FIG. 13 shows diagramatically the extent of each transverse groove to correspond to specific code values.

Upon rotation of the key 66 the tumblers will be rotated to an extent in accordance with the length of the respective of said transverse grooves in alignment therewith. Said transverse grooves or slots 110–113 in comprising the code of the key, determine by the relative rotation of the tumblers to have the code of that key read by the sensors 75 and 77. The code values indicated in FIG. 13 are merely illustrative.

Figure 7:
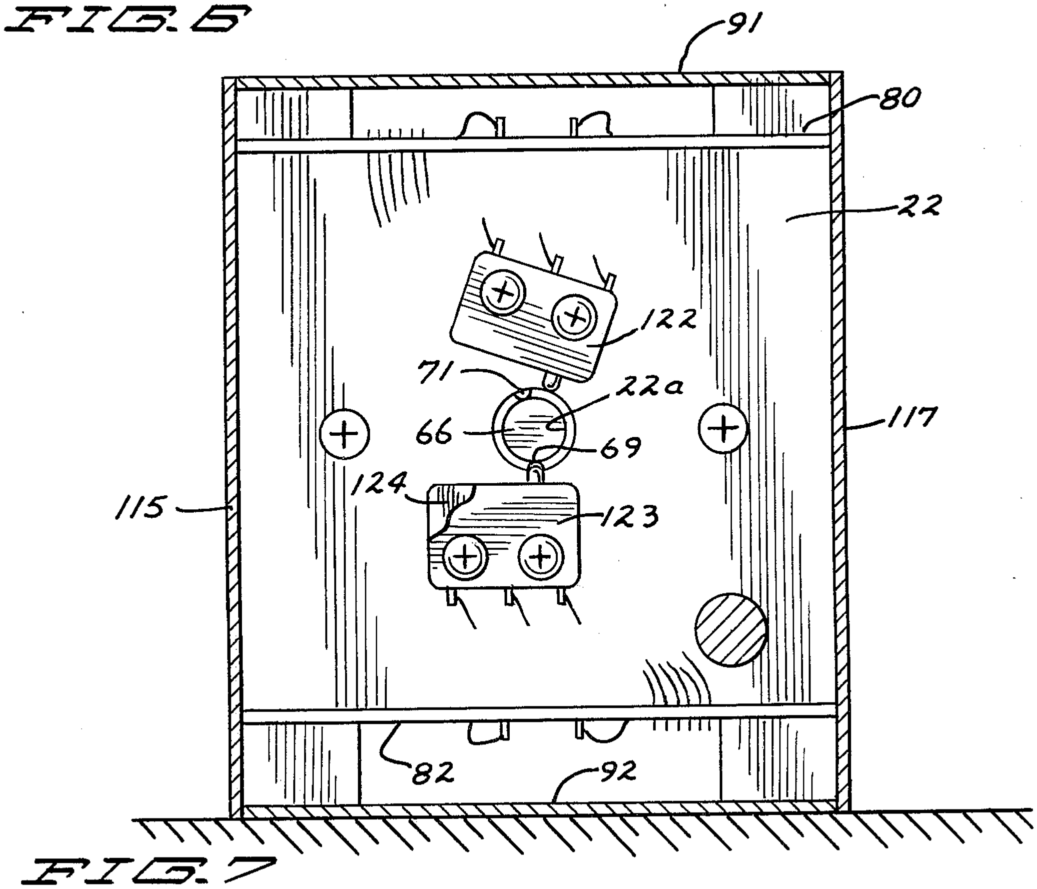
FIG. 7 is a view in vertical cross section taken on line 7—7 of FIG. 2 as indicated.
Figure 8:
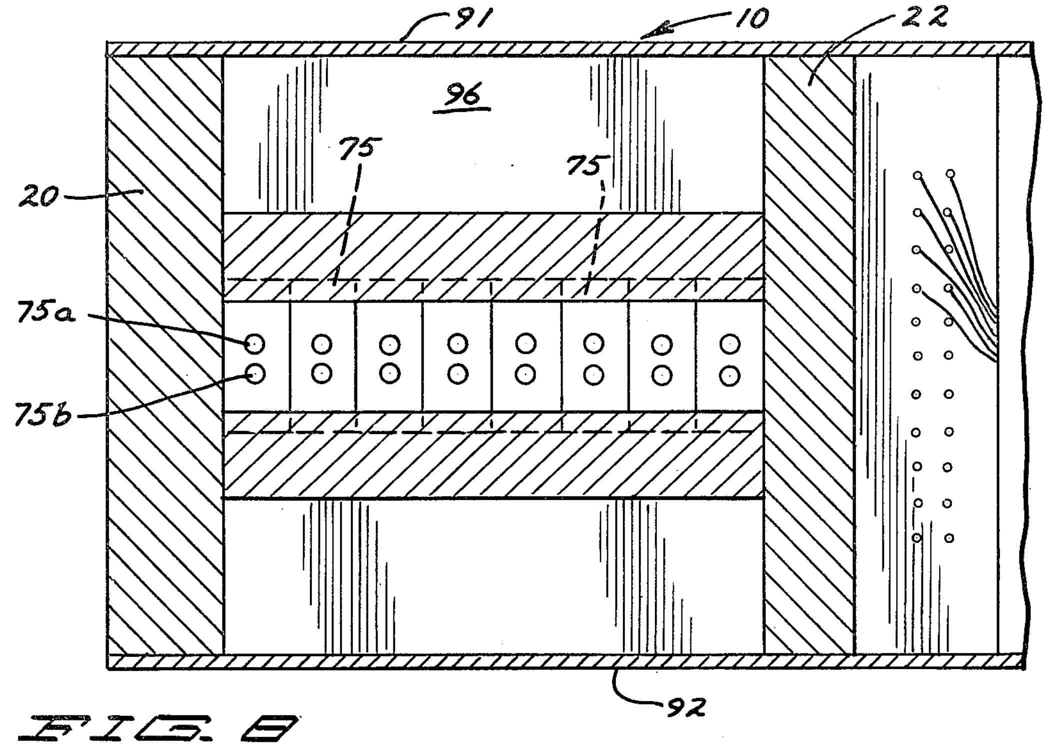
FIG. 8 is a view in horizontal section taken on line 8—8 of FIG. 5 as indicated.
Figure 9:
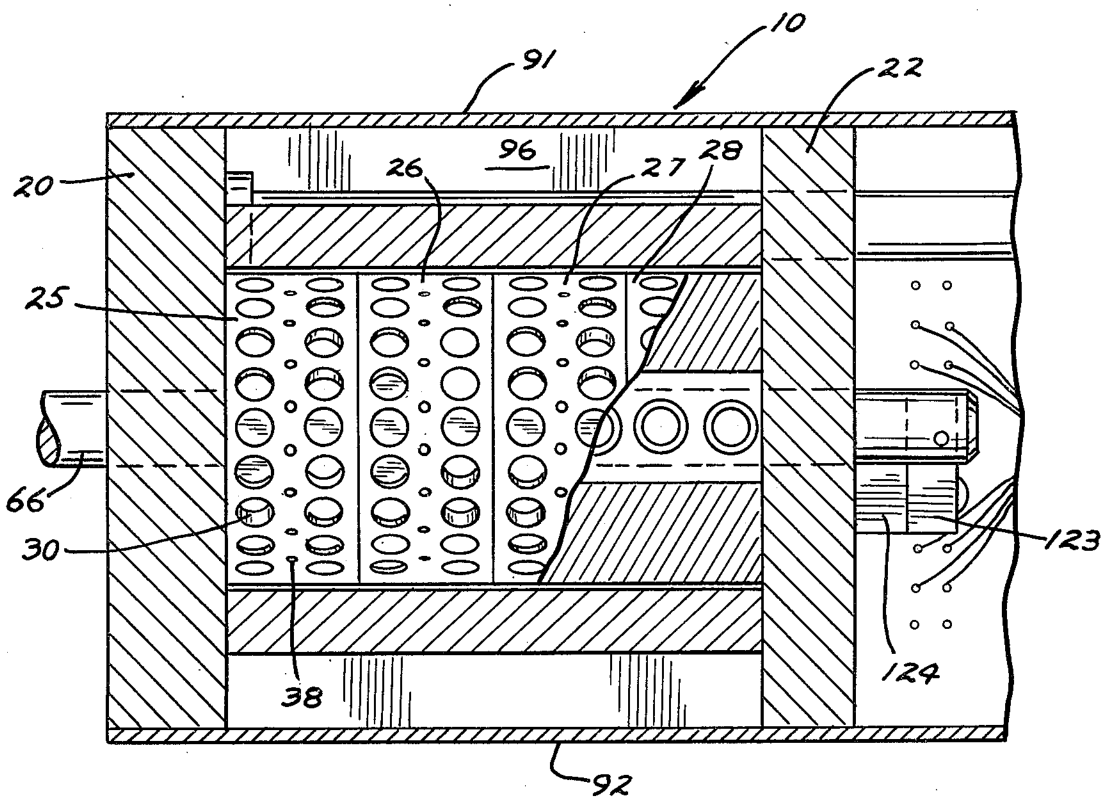
FIG. 9 is a view in horizontal section taken on line 9—9 of FIG. 5 as indicated.

Referring to FIG. 7, mounted upon the outward side of the wall 22 adjacent the bore therethrough are switch members 122, 123 and 124 to be hereinafter described.

Said solenoid 58 of a suitable conventional design is attached to the wall member 92 and its core member 58*a* extending outwardly thereof is here shown having a bifurcated end portion 58*b* receiving therein a reduced end portion 55*a* of the rod 55 and the two end portions may be connected by a suitable pin not here shown.

A cable terminal or connecting member 128 is secured to the wall 91 and extends therethrough as shown. Secured to the underlying pins 128*a* of said terminal are said circuits A running from the printed circuit boards 80 and 82.

Said switch 122 has its lines comprising circuit 122*a* connected to said terminal as are the circuits 123*a* and 124*a* of the switches 123 and 124.

The solenoid 58 is connected to said terminal by its lines 58*b* forming its circuit. A cable 129 runs from said terminal to the electronic assembly 14 connecting the electronic components of the mechanical assembly 12 with the electronic circuitry 87.

Figure 15A:
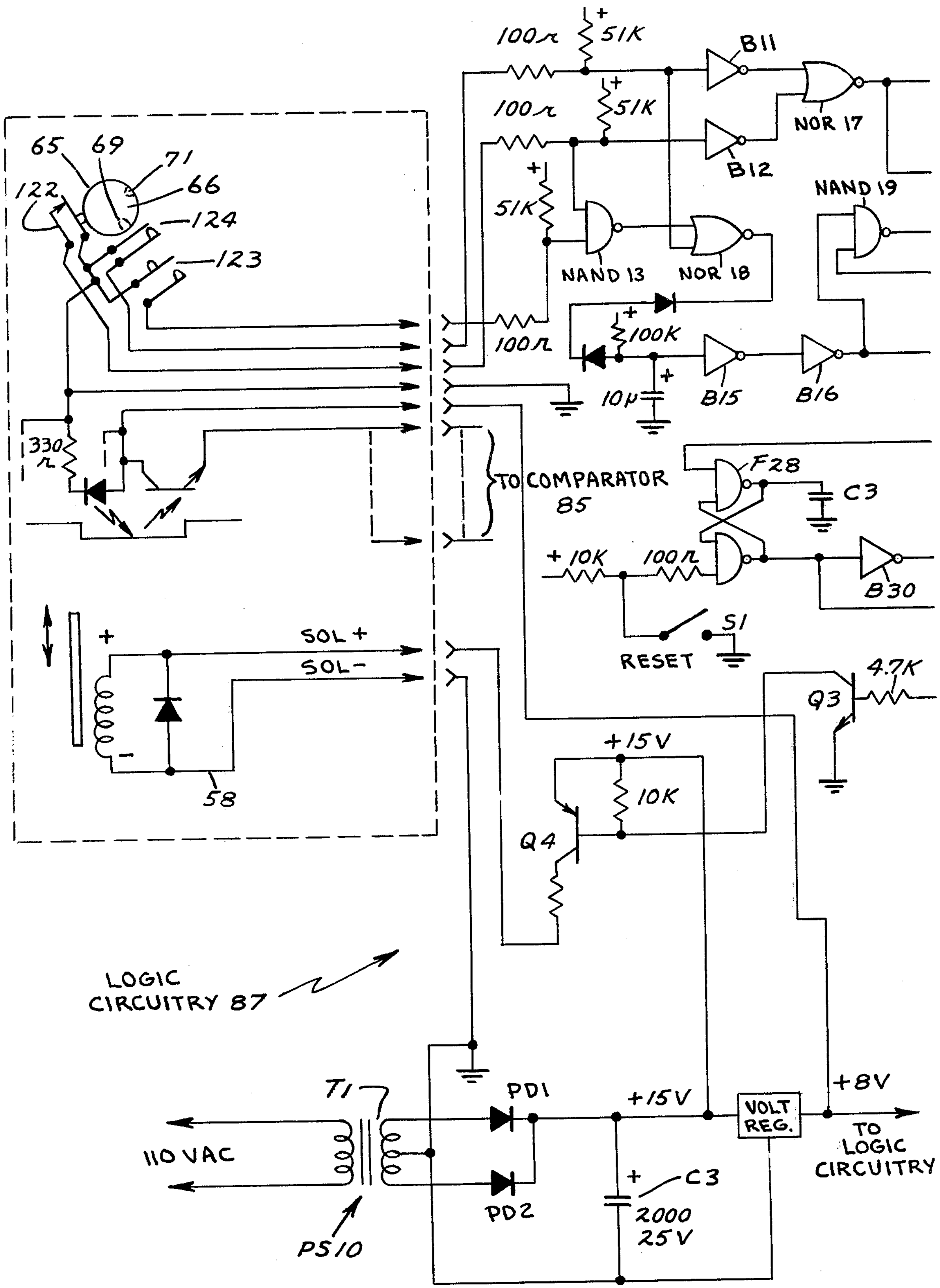
FIGS. 15*a* and 15*b* show a schematic wiring diagram of the logic circuitry.
Figure 15B:
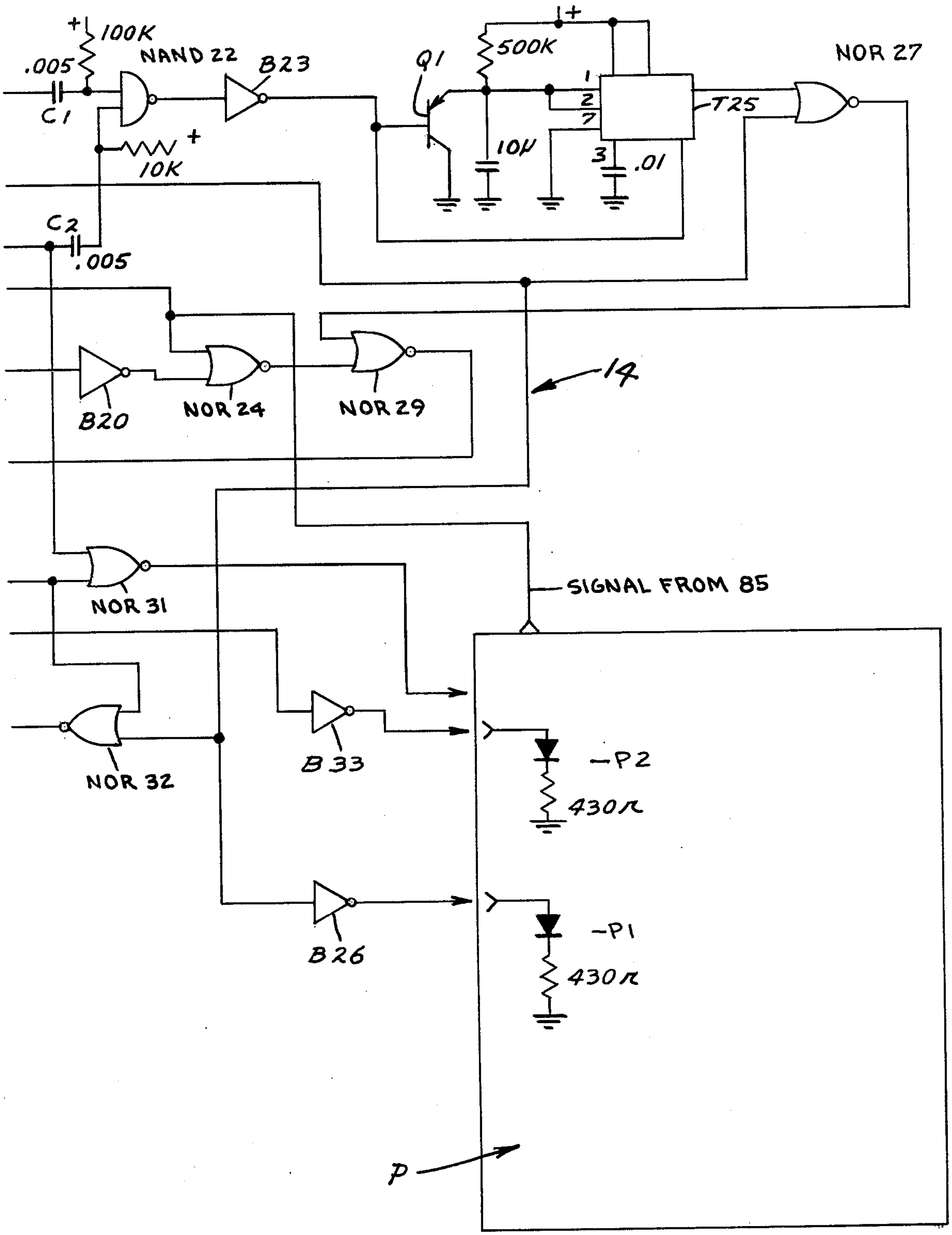

Referring now to FIGS. 15*a*–15*b*, disclosed schematically is the electronic circuitry 87 which senses, monitors and controls the operation of the device and the same is hereafter described.

The mechanical assembly 12 with its switches 122–124 and electronic components is isolated from the electronic or logic circuitry by the inverters B11 and B12.

Hereinafter an inverter will be indicated by a numeral preceded by the letter B. A diode will be indicated by a numeral preceded by the letter D. The gates NOR and NAND are indicated as such followed by a reference numeral.

The operation of the device will be described along with the description of the electronic circuitry 87.

When a key 66 is inserted into the keyway 65, unless the inner end portion 71 of the key engages the normally open switch 122, the device remains inoperative. If the switch 122 is engaged it will become closed and commences the operation of the electronic circuitry causing NOR 17 to go low through B12 and the capacitor C1 differentiates the output of NOR 17 causing a low-going pulse at the input of NAND 22 which is inverted by B23 and applied to the transistor Q1 base to start the timing means or timer T25 for a pre-set operating time period, such as a five second interval.

Also, the output of NOR 17 goes to NOR 23 which drives the transistor Q3 and in turn the transistor Q4 energizing the solenoid 58 to unlatch the tumblers 25–28 and at the same time said output goes to B26 which drives the transistor Q2 to light an LED status symbol P1 upon the monitor panel P indicating a key insertion into the keyway 65.

Upon insertion of the key, the slot 69 in said key overlies and receives therein the plungers of the switches 123 and 124 permitting the switches to remain normally open. Upon rotation of said key, switches 123 and 124 become closed. Switch 122 remains closed during rotation of the key. Upon full rotation of the key, the slot 69 receives the plunger of the key 122 and the recess 71 of the key receives the plunger of the switch 123 permitting the switches 122 and 123 to return to normally open positions and this is sensed by NAND 13 and there is a conventional delay means in the network preceding B15 and isolated by B15 and B16 to permit the switches of 122 and 123 to complete their functions.

The closing of switch 123 causes the sensing means or optic couplers 75 and 77 to become energized and read the code of the tumblers and by a suitable interface cause the code thus read, by means of the comparator 85, to be matched with a corresponding circuit B. Suitable interface circuitry indicated schematically is well known in the art and requires no description. A signal from the comparator 85 indicating that key code has been matched up and that access is allowed is indicated by the panel indicator P3 and is accomplished by means of the capacitor C2 causing a pulse to appear at NAND 22 input and by means of B23 resetting the timer T25 for an additional pre-set time interval to permit the tumblers to be restored to initial or starting position and the key to be returned to its original insert position for withdrawal.

The output of B16 drives B20 and NAND 19. The NAND 19 output goes to NOR 31 to permit access to the matched circuit B for whatever purpose the circuit is intended and by means not here included circuit B will perform its function.

If the flip flop F28 is set, which would be the case of the code read not being matched, the access to circuit B would not be allowed and the solenoid will be de-energized resulting in the tumblers becoming latched and the key locked in position and not removable. To cause this occurrence B20 and NOR 24 will combine and through NOR 29 will cause the flip flop to become set and de-energize the solenoid 58. At the same time the LED alarm indicator P2 on the Panel P will light up for a visual indication of this condition. Other alarms may be added.

A power supply suitable for purposes herein is indicated as PS10 and consists of a transformer T1 reducing the 110 AC power line to +15 VDC by means of the rectifier diodes PD1 and PD2 and the capacitor C3 utilizing what is here indicated as being an LM340 Hauge regulator, which is shelf item, to regulate the +15 VDC down to +8 VDC for use by the logic or electronic circuitry.

Figure 16:
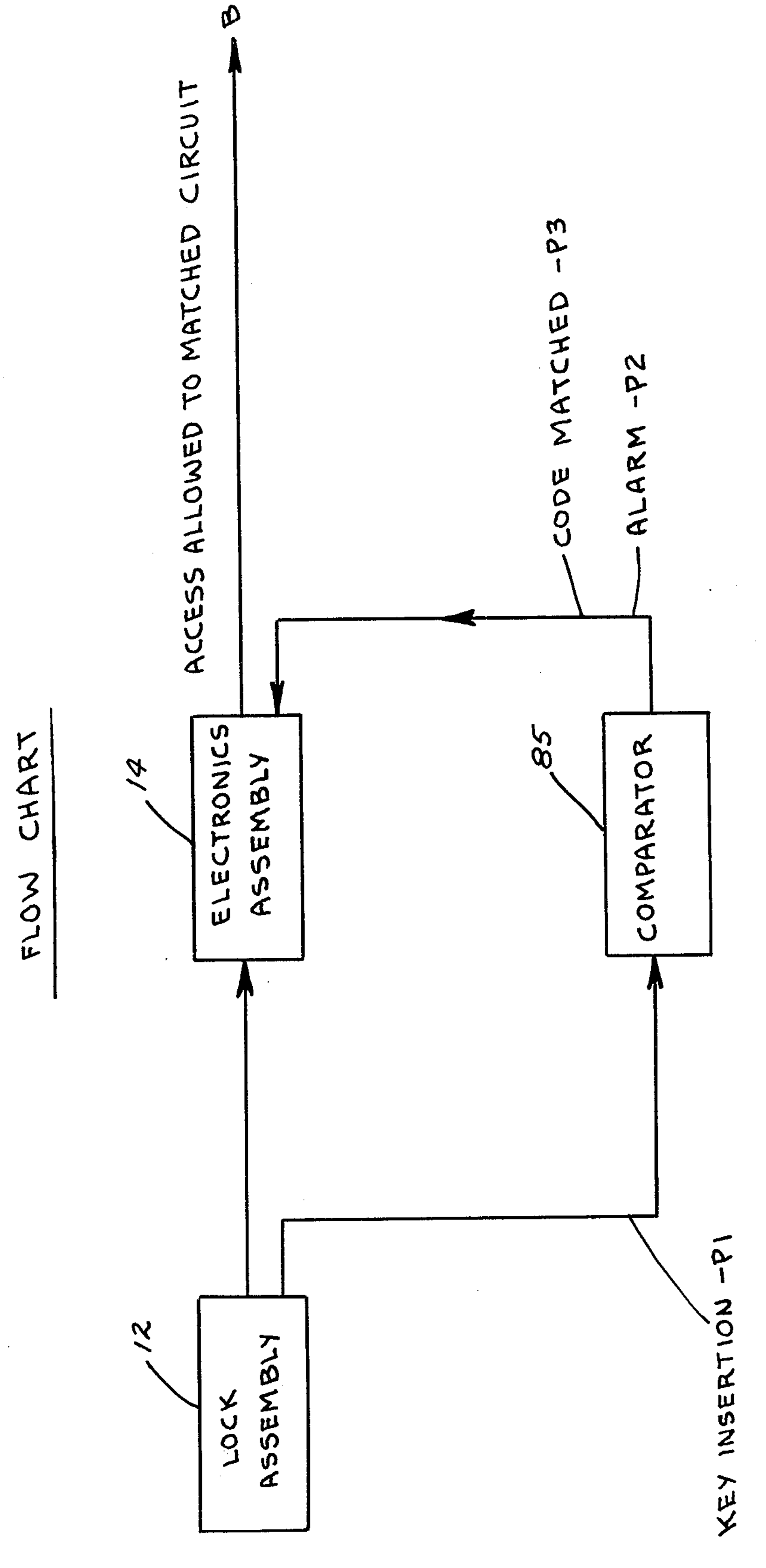
FIG. 16 is a block diagram as a flow chart.

Thus to recap the operation with reference to the flow chart of FIG. 16, the insertion of a key in the lock or mechanical assembly 12 is indicated as at P1 but no rotation of the normally latched tumblers is possible unless the switch 122 is closed which with the related described elements of the electronic assembly 14 energizes the solenoid 58 to unlatch the tumblers, the timer T25 is set for a pre-set operating time interval and upon full rotation of the key, the switch 123 causes the sensers 75 and 77 to become energized to read the code from the tumblers as positioned by the inserted key and by means of a suitable interface cause the code read to be verified by a match up by means of a comparator with a corresponding coded circuit for access thereto. A match up of the code is indicated at P3 and access is allowed to the corresponding circuit B.

If the code is not matched up, the tumblers are caused to become latched and the key is locked into its rotated position and is not removable.

If the code is matched, the timer is re-set for an additional operating time-set interval to permit the return of the tumblers and withdrawal of the key after which the solenoid is de-energized and the tumblers are latched in their initial or start position.

By means said flow chart, the relation of the various parts and the operative steps of the device are readily visualized.

The structure as described is seen not to permit or make possible unauthorized entry to the electronic assembly 14 by means of the mechanical assembly 12 and there is no opportunity to pick the mechanical assembly in order to ascertain a code. The lock up provisions against unauthorized entry provide a very high order of security.

It will of course be understood that various changes may be made in form, details, arrangement and proportions of the parts without departing from the scope of the invention herein which, generally stated, consists in a device capable of carrying out the objects above set forth, in the parts and combinations of parts disclosed and defined in the appended claims.

What is claimed is:

1. A coded solid state entry device, having in combination a mechanical assembly comprising a plurality of rotatable concentric tumblers having a keyway, means supporting said tumblers, said tumblers bearing code indicia, a code bearing key disposed in said keyway engaging said tumblers to indicate a code corresponding to the code of said key, a code indicia sensing means carried by said means, an electronic assembly including a comparator means comparing the code sensed by said sensing means with a corresponding coded circuit, said electronic and said mechanical assembly comprising a first switch means carried by said first mentioned means including signal means visually indicating said key being inserted into said keyway, a timer setting an operating time period and means normally latching said tumblers, a second switch means carried by said first mentioned means supplementing said first switch means to visually indicate said key being inserted into said keyway, a third switch means carried by said first mentioned means including means extending said operating time period, means energizing said code sensing and comparator means, means receiving a signal from said comparator means visually indicating that said code has been compared and matched with a corresponding coded circuit and means allowing access to said matched corresponding coded circuit responsive to said last mentioned signal means, said key respectively engaging said first, second and third switch means in successive operating positions, and means latching said tumblers at the expiration of said operating time period and locking said key if tumblers have not been returned to starting position.

2. The structure of claim 1, including the shank of said key having a portion thereof engaging and closing said first switch means in a first operating position, said shank of said key engaging and closing said second and third switch means in a second operating position of rotation not to exceed 180°, and said shank of said key in a third operating rotated position causing said third switch means to be open.

3. The structure of claim 2, including a delay means in circuit with said first and third switch means delaying the effect of the opening of said switches.

4. The structure of claim 1, including means indicating an alarm display and means latching said tumblers upon failure of said comparator means to match said code sensed with a corresponding coded circuit.

5. The structure of claim 1, wherein said timing means at the expiration of said operating time period de-energizes said tumbler unlatching means to latch said tumblers.

6. The structure of claim 1, including a shank of said key in one operating position having a portion engaging and closing said first switch means, said shank having a slotted portion underlying and not engaging said normally open second and third switch means, said shank being arranged and constructed to engage and close said second and third switch means in a second operating position of rotation not to exceed 180°, said shank having a recess therein opposite said slotted portion therein at the extent of its rotation, and said shank respectively underlying said third switch means and said first switch means upon said rotation to open said third and first switch means.

7. A coded solid state entry device including a plurality of normally latched rotatable tumblers, a keyway axially of said tumblers, code indicia carried by said tumblers, code reading means in connectioon with said tumblers and coupled to a comparator means including a multiplicity of coded circuits, said comparator means matching said code indicia with a corresponding coded circuit and a coded key operating said tumblers, the improvement herein consisting of a first switch means including signal means indicating said key being inserted into said keyway, a timer setting an operating time period and means unlatching said tumblers, a second switch means supplementing said first switch means to continue the indication of a key insertion into said keyway, a third switch means including means extending said time period, means energizing said code reading and comparator means, a visual signal means indicating that said code has compared and matched to a corresponding code circuit and means allowing access to said matched corresponding coded circuit, said coded key being arranged and constructed to engage said switches in successive operating positions and to rotate said tumblers to a code reading position, and means latching said tumblers at the expiration of said operating time period.

8. The structure of claim 7, including a shank portion of said key engaging and closing said first switch means in a first operating position, a slot in said shank releasing and opening said first mentioned switch means in a second operating position, a second shank portion of said key engaging said second and said third switch means closing the same during the movement of said key from said first to said second operating position, and a recess in said shank portion releasing and opening said third mentioned switch means in said second operating position.

9. The structure of claim 7, including means responsive to a failure to match said code causing means to visually indicate an alarm and causing means to latch said tumblers.

10. The structure of claim 7, including means causing said tumblers to be latched upon expiration of said operating time period prior to a match up of the code of said operating key with a corresponding coded circuit.

11. The structure of claim 7, including a shank portion of said key in one operating position having a portion thereof engaging and closing said first switch means, a slot in said shank portion underlying said second and third switch means in said one operating position, said slot portion releasing said first mentioned switch means to open the same in a second operating position, said shank portion being arranged and constructed to retain said second switch means in closed position and open said third switch means in said second operating position, and means delaying the effect of said first switch means being in open position until said third switch means is in open position.

* * * * *